United States Patent [19]
Ito et al.

[11] Patent Number: 5,667,244
[45] Date of Patent: Sep. 16, 1997

[54] METHOD AND APPARATUS FOR DETECTING AN IMPACT ON A VEHICLE

[75] Inventors: Koji Ito, Ama gun; Taneichi Kawai, Anjo, both of Japan

[73] Assignee: Aisin Seiki Kabushiki Kaisha, Kariya, Japan

[21] Appl. No.: 621,249

[22] Filed: Mar. 25, 1996

[30] Foreign Application Priority Data

Mar. 27, 1995 [JP] Japan .................................. 7-094456

[51] Int. Cl.$^6$ .................................................. B60R 21/32
[52] U.S. Cl. ....................... 280/735; 180/282; 701/47
[58] Field of Search .......................... 280/735; 180/282; 364/424.05

[56] References Cited

U.S. PATENT DOCUMENTS

| | | | |
|---|---|---|---|
| 5,034,891 | 7/1991 | Blackburn et al. | 364/424.05 |
| 5,036,467 | 7/1991 | Blackburn et al. | 364/424.05 |
| 5,065,322 | 11/1991 | Mazur et al. | 364/424.05 |
| 5,185,701 | 2/1993 | Blackburn et al. | 364/425 |
| 5,285,187 | 2/1994 | Hirao et al. | 280/735 |
| 5,345,402 | 9/1994 | Gioutsos et al. | 280/735 |
| 5,363,302 | 11/1994 | Allen et al. | 280/735 |
| 5,389,822 | 2/1995 | Hora et al. | 280/735 |

FOREIGN PATENT DOCUMENTS

| | | |
|---|---|---|
| 4-275685 | 10/1992 | Japan . |
| 4-358945 | 12/1992 | Japan . |
| 6-211100 | 8/1994 | Japan . |
| 6-298037 | 10/1994 | Japan . |

*Primary Examiner*—Kenneth R. Rice
*Attorney, Agent, or Firm*—Burns, Doane, Swecker & Mathis, LLP

[57] ABSTRACT

The invention is directed to a method and apparatus for detecting an impact on a vehicle. The apparatus includes an acceleration sensor for sensing an acceleration of the vehicle, and a transformer for transforming the acceleration into an electric signal indicative of the acceleration to output an acceleration signal. A wavelet transformer transforms the acceleration signal by a wavelet function into a wavelet coefficient. The wavelet function is provided on the basis of a mother wavelet function localized in time, scaled in response to a scale parameter, and shifted in response to a shift parameter indicative of a time localization. Then, an impact determination device determines a condition of the impact on the basis of the wavelet coefficient with respect to at least a predetermined reference scale parameter. The apparatus may further include a vehicle passenger restraint system which restrains passengers in the vehicle in accordance with the result of determination by the impact determination device.

19 Claims, 10 Drawing Sheets

METHOD AND APPARATUS FOR DETECTING AN IMPACT ON A VEHICLE

BACKGROUND OF THE INVENTION

1. Field of the Invention

The present invention relates to a method and apparatus for detecting an impact on an automotive vehicle, and the apparatus for detecting the impact to actuate a vehicle passenger restraint system, and more particularly to the method and apparatus using a wavelet function provided on the basis of a mother wavelet function which is localized in time, for use in the restraint system such as an air bag system, a seat belt pre-loader or the like.

2. Description of the Prior Arts

Recently, an air bag system is installed in a vehicle as a restraint system to supplement a seat belt. That is, the air bag is provided for lessening the shock to a driver in the event of a frontal an impact on the vehicle exceeding a predetermined level. According to a conventional air bag system, when an acceleration sensor senses the frontal an impact greater than a predetermined threshold level, an air bag inside a steering wheel is momentarily inflated to reduce the shock to the driver. In this restraint system, it is important to detect the impact on the vehicle accurately and rapidly. Therefore, improvement of an acceleration sensor is required, and also required is improvement in a method and apparatus for detecting an impact force, a condition of the impact, or the like, accurately in response to an acceleration signal sensed by the acceleration sensor. In Japanese Patent Laid-open publication No.4-358945, for example, it is proposed to detect a collision accurately even in the case where output of the acceleration signal is delayed largely, in such a case as oblique an impact, pole an impact, or the like. There is proposed an actuator for a vehicle restraint system, wherein an integral value of the acceleration signal for a predetermined period of integration and a differential value of the acceleration signal at a predetermined time for the period of integration are summed to determine the impact in response to the result of summation.

In Japanese Patent Laid-open Publication No.6-211100, a vehicle collision detecting method is proposed to detect the impact rapidly and accurately, by means of the steps of obtaining a short term integral value and a long term integral value of an output of an acceleration sensor, computing an impact force by sampling its component in a particular band especially caused in case of a vehicle collision and square-multiplying the component, and then determining the impact when both of the impact force and the short term integral value exceed predetermined threshold levels, respectively, or when the long term integral value exceeds a predetermined threshold level, thereby to determine the impact totally on the basis of the amount of the velocity varied during the short and long terms along with the impact force.

In the U.S. Pat. No. 5,185,701, it is proposed to provide a method for distinguishing between different types of vehicle crashes by determining which frequency components are present in a signal from a deceleration sensor upon the occurrence of a vehicle crash condition. Also, in the U.S. Pat. No. 5,034,891, it is proposed to provide a method and apparatus for electrically controlling an actuatable passenger restraint system which includes filter means connected to sensing means for providing a signal having a value when the sensing means provides a signal that includes particular frequency components. Furthermore, in the U.S. Pat. No. 5,065,322, it is proposed to provide a method and apparatus for electrically controlling an actuatable passenger restraint system which actuates the system only upon a frequency domain summation algorithm indicating the occurrence of a predetermined type of crash. It is proposed in the U.S. Pat. No. 5,036,467 to provide a method and apparatus for electrically-controlling an actuatable passenger restraint system which actuates the system only upon a frequency domain integration and summation algorithm indicating the occurrence of a predetermined type of crash. As one aspect of the invention disclosed in the last United States Patent for example, a method is provided for controlling actuation of a passenger restraint system in a vehicle. The method includes the steps of providing a time domain vibratory electric signal having frequency components indicative of a vehicle crash condition, transforming the time domain vibratory electric signal over at least two time intervals into associated frequency domain signals, integrating each of the frequency domain signals, summing the integrals of the frequency domain signals, and actuating the passenger restraint system when the sum of the integrals of the frequency domain signals indicates a predetermined type of vehicle crash is occurring.

According to the above-described methods and apparatuses for detecting the impact, however, the differential value or integral value of the acceleration (deceleration), the sum or integral value of the particular frequency or the like has been used, so that the time component may cause changes in various conditions such as the direction of the impact, to result in an error or delay in detecting the impact, which can not be recovered to ensure a desired property by an ordinary way of recovery such as a way for eliminating a noise. Yet, it is extremely difficult to determine a condition of the impact on the vehicle. In the method and apparatus as described in the United States Patents listed above, the frequency component of the vibratory electric signal caused in collision is to identified. Thus, as far as a target to be controlled includes the frequency component, it is difficult to cancel any noise completely, so that it may cause a delay in time when determining the impact, depending upon the condition of the impact. Even if well known Fourier transform was used for analyzing the acceleration signal, it would be difficult to measure accurately the time when a particular frequency component generates, so that it would be difficult to provide an accurate time for inflating the air bag.

In a field of analyzing signals, the Fourier transform has been utilized in many occasions. In order to divide or combine those signals, a wavelet transform is getting popular recently for use in various fields such as audio, display or the like, as disclosed in Japanese Patent Laid-open Publication No. 4-275685. It is known that the wavelet transform is a method for dividing an input signal into wavelets as its components, and re-configuring the original input signal as a linear coupling of the wavelets. The wavelet transform is effectively used for analyzing an unsteady state, such as state transition or the like, and has as its base a mother wavelet function, to which a scale transform and a shift transform are performed. The mother wavelet function is a square-integrable function which is localized in time, and the base of which may be selected freely as far as flexible admissible conditions can be met, although the base has to be the one to be bounded, or the one to be attenuated rapidly in a remote area. Furthermore, the mother wavelet function may be used effectively for identifying a position of a singular point, because it has various characteristics, such that the base is analogous, that the direct current component is not included, and that a dissector rate for analysis can be provided freely.

In the meantime, it is so arranged that when the impact is applied to the vehicle in collision, vibration caused by the impact is transmitted to an acceleration sensor which outputs a signal corresponding to the impact force. This output signal has a repeatability depending upon structure of the vehicle, e.g. a front structure of the vehicle in case of a frontal collision. Therefore, if a singular characteristic can be found by analyzing the output signal, conditions of the impact (e.g., direction, magnitude or the like of the impact) can be made clear.

SUMMARY OF THE INVENTION

Accordingly, it is an object of the present invention to provide a method and apparatus for accurately detecting an impact on an automotive vehicle without being affected by noise, and irrespective of conditions of the impact.

It is another object of the present invention to provide an apparatus for accurately detecting an impact on an automotive vehicle for use in a vehicle passenger restraint system so as to effectively protect the passenger without being affected by noise, and irrespective of conditions of the impact.

It is a further object of the present invention to provide an apparatus for accurately detecting an impact on an automotive vehicle and distinguishing conditions of the impact on the vehicle for use in a vehicle passenger restraint system so as to protect the passenger in an appropriate manner depending upon the conditions of the impact.

In accomplishing the above and other objects, a method is provided for detecting an impact on a vehicle. The method includes the steps of sensing an acceleration of the vehicle, transforming the acceleration into an electric signal indicative of the acceleration to output an acceleration signal, transforming the acceleration signal into a wavelet coefficient by a wavelet function which is provided on the basis of a mother wavelet function localized in time, scaled in response to a scale parameter, and shifted in response to a shift parameter indicative of a time localization, and determining a condition of the impact on the basis of the wavelet coefficient with respect to at least a predetermined reference scale parameter.

According to the method for detecting the impact on the vehicle, the acceleration of the vehicle is transformed into the electric signal to output the acceleration signal, to which the wavelet transform is performed. That is, there is provided as a base, a mother wavelet function which is localized with respect to at least a "time" domain, such as Gabor function or the like. Then, by means of a wavelet function which is provided on the basis of the mother wavelet function, the wavelet transform is performed in accordance with a scale parameter (hereinafter, indicated by (a)) and a shift parameter (indicated by (b)). In other words, the mother wavelet function is transformed in scale by "a" times in accordance with the scale parameter (a) to provide the wavelet function, by which the acceleration signal is transformed into a wavelet coefficient F(a, b) in accordance with the shift parameter (b). Then, a certain scale parameter is set for the predetermined reference scale parameter (a1). On the basis of the condition of the wavelet coefficient F(a1, b) with respect to at least the reference scale parameter (a1), or on the basis of the timing for generating the same, the condition (magnitude, direction or the like) of the impact is determined. That is, various references for determining the magnitude, direction or the like (e.g., a predetermined threshold level "F0") may be provided for the wavelet coefficient F(a1, b) with respect to the reference scale parameter (a1). The wavelet coefficient F(a1, b) at the time of determining the condition of the impact is compared with the references. In response to the result of this comparison, the signal indicative of the condition of the impact is output.

Also provided is an apparatus for detecting an impact on a vehicle. The apparatus comprises means for sensing an acceleration of the vehicle, means for transforming the acceleration into an electric signal indicative of the acceleration to output an acceleration signal, and means for transforming the acceleration signal by a wavelet function into a wavelet coefficient. The wavelet function is provided on the basis of a mother wavelet function localized in time, scaled in response to a scale parameter, and shifted in response to a shift parameter indicative of a time localization. The apparatus further comprises means for determining a condition of the impact on the basis of the wavelet coefficient with respect to at least a predetermined reference scale parameter.

The apparatus may further comprise means for restraining passengers in the vehicle in accordance with the result of determination by the determining means. In this apparatus, the restraining means may include a plurality of vehicle restraint devices, and the means for transforming the acceleration signal into the wavelet coefficient may include means for providing a plurality of mother wavelet functions on the basis of vibration systems propagating from a plurality of outer sections of the vehicle to the sensor, to provide a plurality of wavelet coefficients for the vibration systems on the basis of the mother wavelet functions, respectively. Then, the means for determining the condition of the impact may further include means for determining the impact on each of the outer sections of the vehicle on the basis of the respective wavelet coefficient provided for each of the outer sections, and actuating at least one of the restraint devices in accordance with the result of the determining means.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
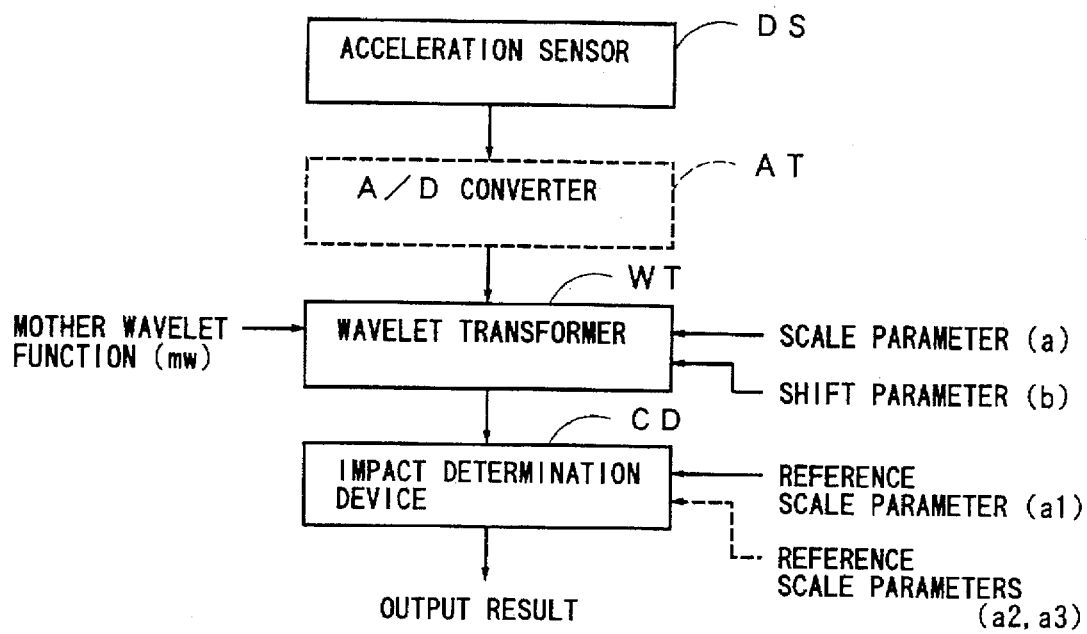
FIG. 1 is a schematic block diagram showing a basic construction of an impact detecting system according to the present invention.

Referring to FIG. 1, there is schematically illustrated an impact detection system for use in an automotive vehicle according to the present invention. An acceleration sensor (DS) is provided for sensing an acceleration of the vehicle and transforming it into an electric signal indicative of the acceleration to output an acceleration signal. A wavelet transformer (WT) is provided for transforming the acceleration signal by a wavelet function into a wavelet coefficient F(a, b). The wavelet function is provided on the basis of a mother wavelet function (mw), scaled in response to a scale parameter (a), and shifted in response to a shift parameter (b) which indicates a time localization. An impact determination device (CD) is provided for determining a condition of the impact on the vehicle in accordance with the wavelet coefficient F(a1, b) which is provided with respect to at least a predetermined reference scale parameter (a1). Furthermore, an analog-to-digital (A/D) converter AT may be provided for converting the acceleration signal detected by the acceleration sensor (DS) into a digital signal, which is transformed by the wavelet transformer WT into the wavelet coefficient F(a, b). The impact determination device (CD) may be so arranged as to determine the condition of the impact on the basis of the condition of the wavelet coefficients F(a1, b), F(a2, b), F(a3, b), or the timing of generating the same. The wavelet transformer WT may be so arranged as to transform the acceleration signal by a wavelet function which is provided on the basis of a function which differentiates the mother wavelet function (mw).

Figure 2:
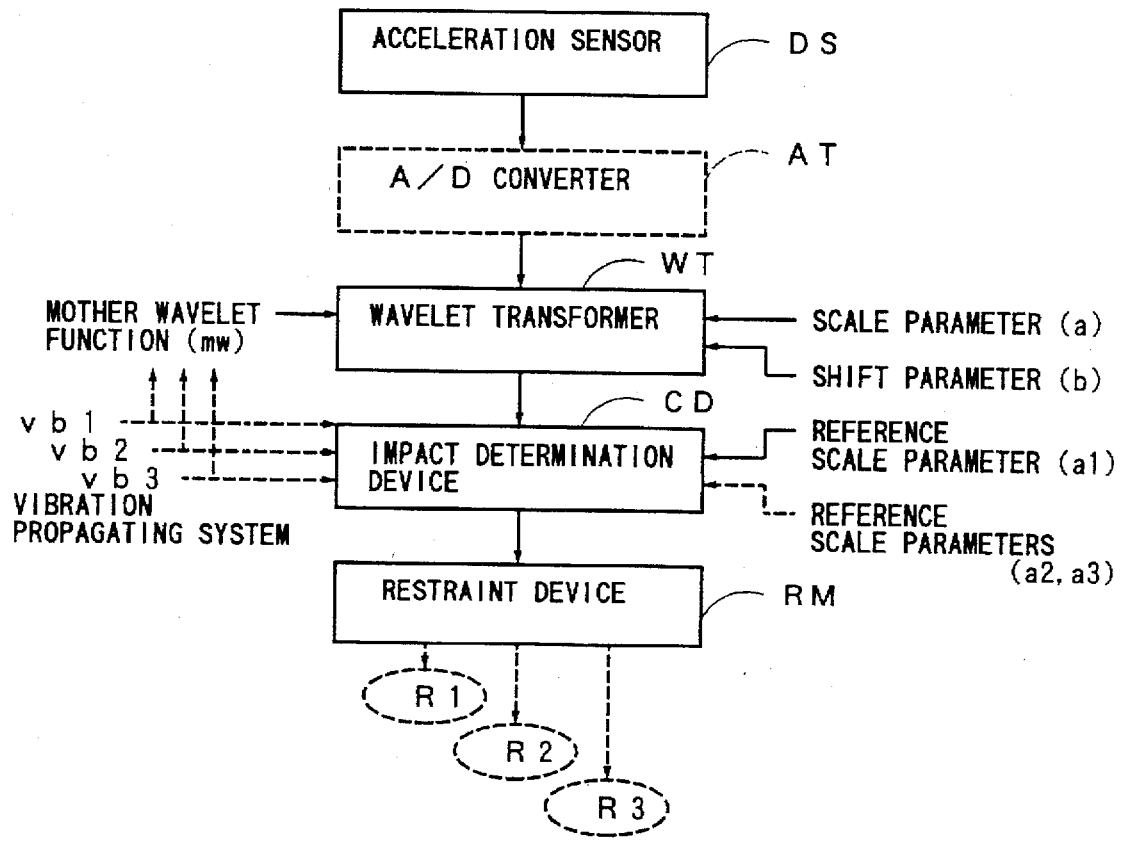
FIG. 2 is a schematic block diagram showing a construction of an air bag system according to an embodiment of the present invention.

As shown in FIG. 2, a restraint device (RM) may be provided for restraining passengers in a vehicle in response to a result of the impact determination device (CD). For the restraint device (RM), an air bag device, a seatbelt device or the like may be employed. The impact determination device (CD) may be so arranged as to provide a plurality of wavelet coefficients F(a1,b), F(a2,b), F(a3,b) with respect to reference scale parameters (e.g., a1, a2, a3) for vibration systems (e.g., vb1, vb2, vb3) propagating from a plurality of outer sections of the vehicle to the acceleration sensor (DS) respectively, and determine the condition of the impact on each of the outer sections of the vehicle. Then, at least one of a plurality of restraint devices (e.g., R1, R2, R3) provided as shown in FIG. 2 may be actuated, in accordance with the result determined by the impact determination device (CD). According to either system as shown in FIGS. 1 and 2, therefore, the impact applied to the vehicle can be detected correctly, without being affected by noise, and irrespective the condition of the impact.

Figure 3:
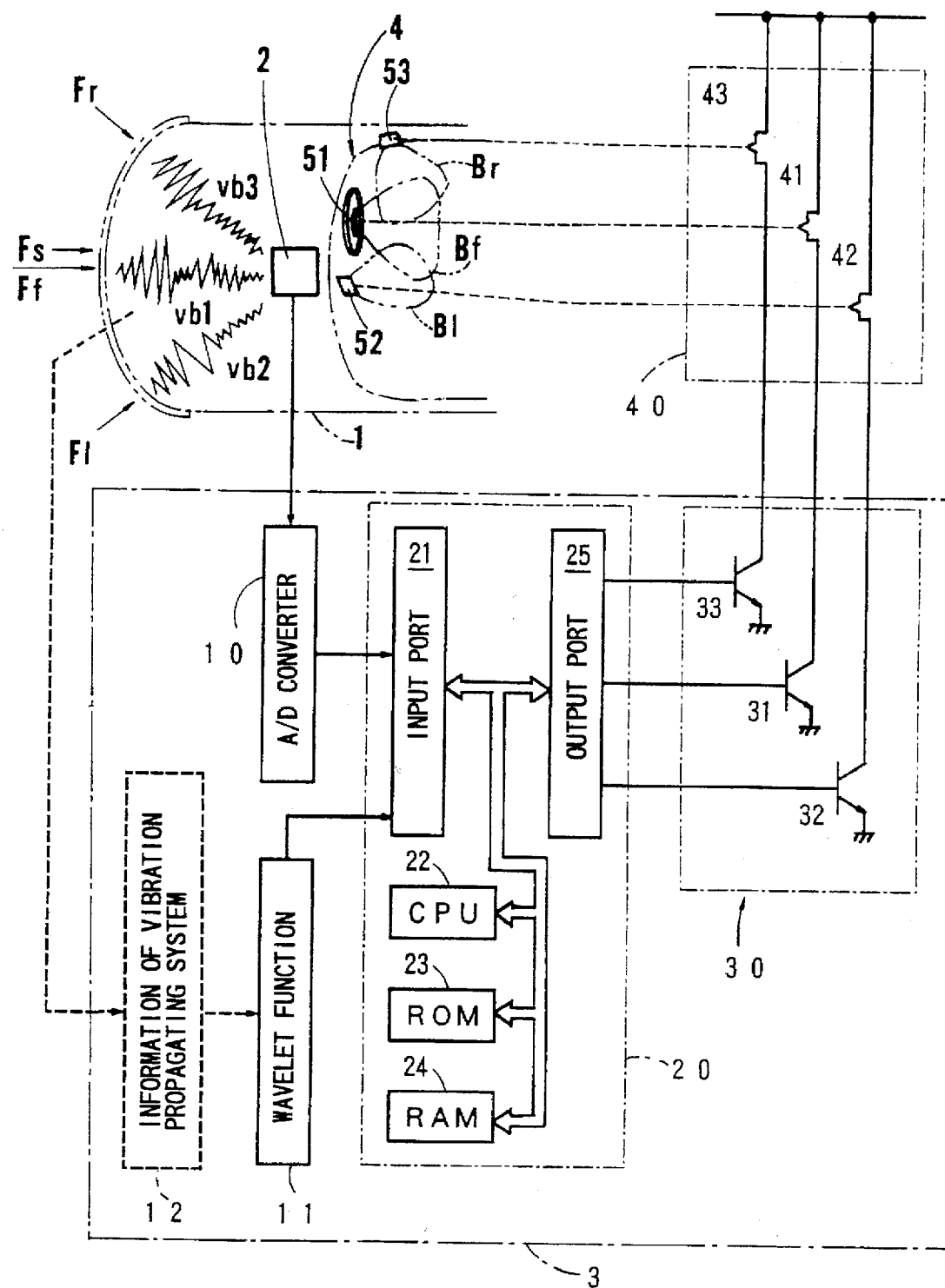
FIG. 3 is a schematic drawing of overall construction of an air bag system according to an embodiment of the present invention.

Referring to FIG. 3, there is disclosed a vehicle passenger restraint system provided with the impact detection system, more particularly to an air bag system, in which an acceleration sensor 2 is disposed on a certain place, e.g., a central portion of a vehicle 1, and electrically connected to an air bag device 4. The air bag device 4 includes a plurality of air bags Bf, Br, Bl as shown in FIG. 3 in their inflated conditions by two-dotted chain lines, and inflaters 51–53 for inflating them.

Figure 9:
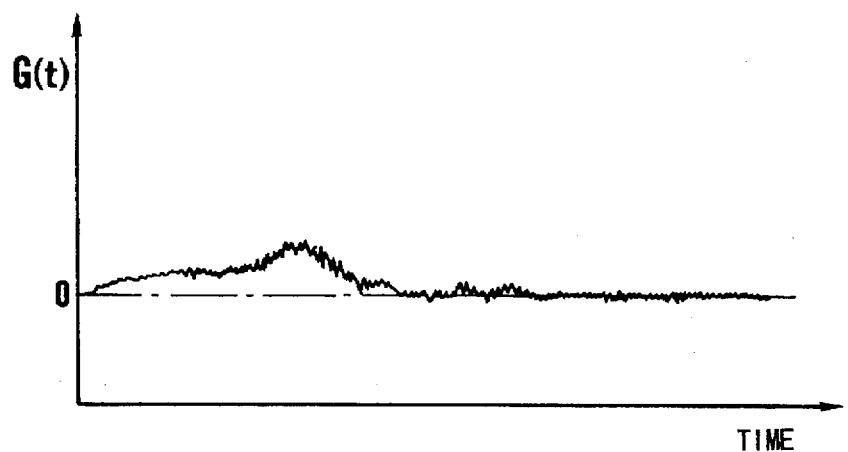
FIG. 9 is a diagram showing an example of a characteristic of a signal sensed by an acceleration sensor according to an embodiment of the present invention.
Figure 10:
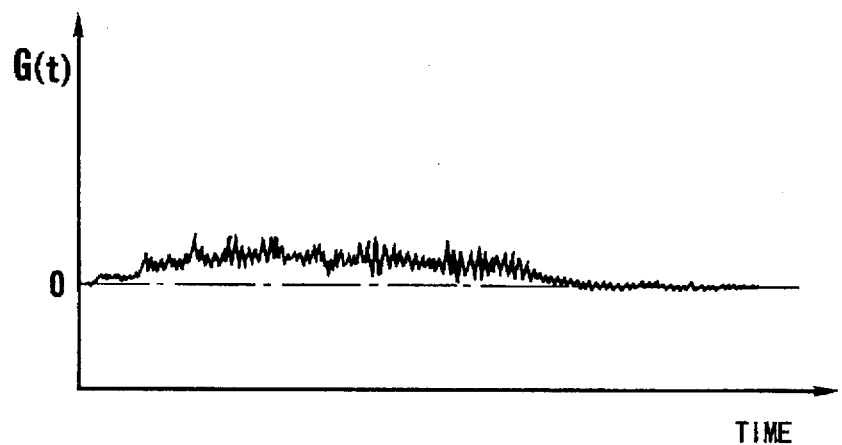
FIG. 10 is a diagram showing another example of a characteristic of a signal sensed by an acceleration sensor according to an embodiment of the present invention.
Figure 11:
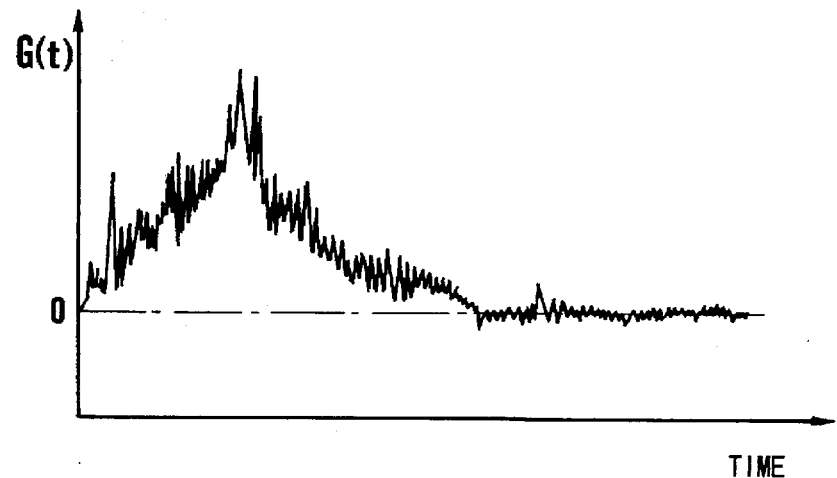
FIG. 11 is a diagram showing a further example of a characteristics of a signal sensed by an acceleration sensor according to an embodiment of the present invention.

The acceleration sensor 2 is arranged to output a signal responsive to an acceleration (including a deceleration as a negative value) of the vehicle 1. Any types of sensor may be employed for the acceleration sensor 2, such as that of a mechanical type using a mass-rotor, the one having a strain gauge made of a semi-conductor, or the like, provided that they output electric signals indicative of the accelerations as shown in FIGS. 9–11. Or, may be employed such a sensor that outputs an acceleration signal only in the case where a deceleration of the vehicle 1 reaches the value corresponding to an impact force more than a predetermined level when a vehicle collision is caused. FIGS. 9–11 illustrate an output characteristic of the acceleration sensor 2 which outputs continuous analog signals. FIG. 9 shows its characteristic in the case where a head-on collision was caused when the vehicle 1 was running at a relatively low speed, so that the air bag device 4 was inoperative. FIG. 10 shows its characteristic when an offset collision or an oblique collision was caused. In this case, at least either one of the air bags Br or Bl must be inflated. FIG. 11 shows its characteristic in the case where the head-on-collision was caused when the vehicle 1 was running at high speed. In this case, at least a front air bag Bf must be inflated, and the air bags Br, Bl may be inflated depending upon magnitude of the collision, for example.

The acceleration sensor 2 is connected to an electronic control unit 3 in such a manner that the output of the acceleration sensor 2 is fed to a microcomputer 20 through an A/D converter 10. An ignition control circuit 30 is connected to the microcomputer 20 to be driven thereby, so that an ignition device 40 is driven by the ignition control circuit 30. The ignition device 40 includes squibs 41–43 which ignite the inflaters 51–53. The microcomputer 20 is constituted in such a conventional manner that an input port 21, a central processing unit (CPU) 22, a read only memory (ROM) 23, a random access memory (RAM) 24, an output port 25 and etc. are connected to each other through a common bas. A signal is input from the A/D converter 10 to the input port 21, and computed at the CPU 22, and then output from the output port 25 to the ignition control circuit 30. The microcomputer 20 includes a wavelet function (e.g., Gabor function) 11 provided with one reference scale parameter or a plurality of reference scale parameters. In the microcomputer 20, the ROM 23 memorizes a program corresponding to flowcharts as shown in FIGS. 4 to 8, the CPU 22 executes the program while an ignition switch (not shown) is closed, and the RAM 24 temporarily memorizes variable data needed to execute the program.

The ignition control circuit 30 includes switching transistors 31–33, for example, which are turned on or off in response to outputs from the microcomputer 20, so as to heat up the squibs 41–43 in the ignition device 40. The inflaters 51–53 are provided therein with the squibs 41–43, respectively, and constituted in the same fashion. In each of the inflaters 51–53, when the respective one of the squibs 41–43 is heated, ignition agent (not shown) contained in the squib is ignited, so that fire spreads instantaneously to gas generant (not shown), which generates a large amount of gas (e.g., nitrogen gas). The inflaters 51–53 are provided for supplying the gas to a bag Bf which is installed in a steering wheel pad, a left bag Bl which is installed under the left side of an instrument panel, and a right bag Br which is installed on the right side of a compartment, respectively. The structure and function of each of the inflaters, bags and etc. are the substantially same as those employed in the air bag system already on the market, so that detailed explanation of those is omitted.

The definition of the wavelet transform used in the present invention will be explained hereinafter, as well as other terminologies used in the present application. First of all, the base of the wavelet transform is called a mother wavelet function h(t), which is a square-integrable transform function, and whose norm has been normalized, and which is localized in a time domain, at least. This mother wavelet function h(t) may be defined as the one to satisfy the following formula (1), which is called an admissible condition, and which indicates that a direct current component (or, mean value) of the signal is zero.

$$\hat{h}(0) = \frac{1}{\sqrt{2\pi}} \int h(t)dt = 0 \qquad (1)$$

Then, the wavelet function is provided by scaling the mother wavelet function by "a" times, and then translating, or shifting its original point by "b", in accordance with the following formula (2):

$$h_{a,b}(t) \equiv \frac{1}{\sqrt{a}} h\left(\frac{t-b}{a}\right) \qquad (2)$$

Therefore, supposing that a function to be analyzed is f(t), the wavelet transform is defined as shown in the following formula (3):

$$F(a,b) \equiv \langle h_{a,b}(t), f(t) \rangle \qquad (3)$$
$$\equiv \int h^*_{a,b}(t)f(t)dt$$

where F(a,b) indicates a wavelet coefficient, < > indicates an inner product, and * indicates a complex conjugate.

The wavelet function used for analyzing something is called an analyzing wavelet (mother wavelet function), for which the Gabor function or the like is employed. For example, Morlet's wavelet, which is one of the Gabor functions, and which is defined in the following formula (4), is known as the analyzing wavelet suitable for analyzing a signal having such a singularity that a differential coefficient is discontinuous.

$$h(t) = \exp(-j\omega_0 t)\exp\left(\frac{-t^2}{2}\right), \omega_0 = 5-6 \qquad (4)$$

Figure 4:
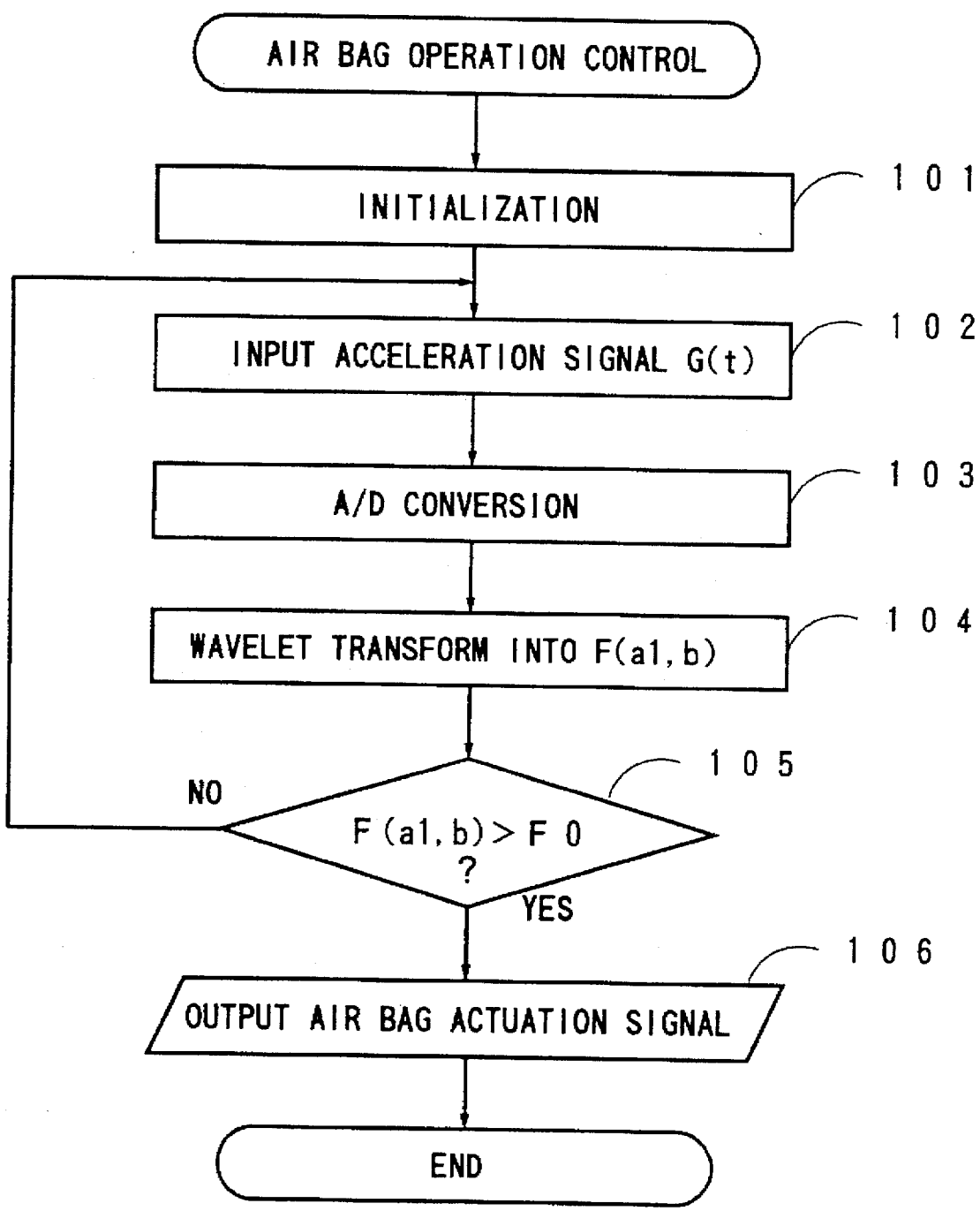
FIG. 4 is a flowchart showing operation of an air bag system according to an embodiment of the present invention.

The program routine executed by the electronic control unit 3 for detecting the impact and controlling the air bag system will now be described with reference to FIGS. 4–8. The program routine corresponding to the flowchart as shown in FIG. 4 starts when the ignition switch (not shown) is turned on, and provides for initialization of the system at Step 101 to clear various data. When the vehicle collides to reduce its speed suddenly, the program proceeds to Step 102 where the acceleration sensor 2 senses deceleration of the vehicle to generate an acceleration signal G(t) in proportion to the magnitude of the deceleration, as shown in FIGS. 9–11, to provide it for detecting the impact.

Next, the program proceed to Step 103, where the signal output from the acceleration sensor 2 is converted into a digital signal by the A/D converter 10 to be input into the microcomputer 20 in the form of the aforementioned function f(t), for example. Then, at Step 104, the wavelet transform is performed in accordance with a shift parameter "b" (hereinafter, referred to as a time localization (b)), and a predetermined scale parameter "a" (hereinafter, referred to as a scale (a)), so that a wavelet coefficient F (a, b) is computed. That is, the function f(t) is integrated by convolution of the mother wavelet function, and a predetermined reference scale parameter, e.g., scale (a1), is used to provide a wavelet coefficient F(a1, b). And, the wavelet coefficient F(a1, b) is compared with a predetermined threshold level "F0". If it is determined at Step 105 that the wavelet coefficient F(a1, b) is equal to or less than the threshold level "F0", the program returns to Step 102 to repeat the above-described steps. However, if it is determined that the wavelet coefficient F(a1, b) exceeds the threshold level "F0", the program proceeds to Step 106 where a signal for actuating the air bag system is output. In terms of a function allowing the signal with a certain scale parameter, therefore, a filter is constituted to provide a so-called wavelet filter. Then, the program proceeds to Step 106, where a signal is output, or a plurality of signals are output from the microcomputer 20 for actuating one of the air bags Bf, Br, Bl (e.g., Bf), or a plurality of air bags as shown in FIG. 2, so that the transistor 31 is turned on to heat up the squib 41. Consequently, igniting agent (not shown) in the inflater 41 is ignited to spread the fire to the gas generant (not shown), which generates a large amount of nitrogen gas. The bag Bf is inflated by the nitrogen gas instantaneously, and spread in front of a vehicle driver.

Figure 5:
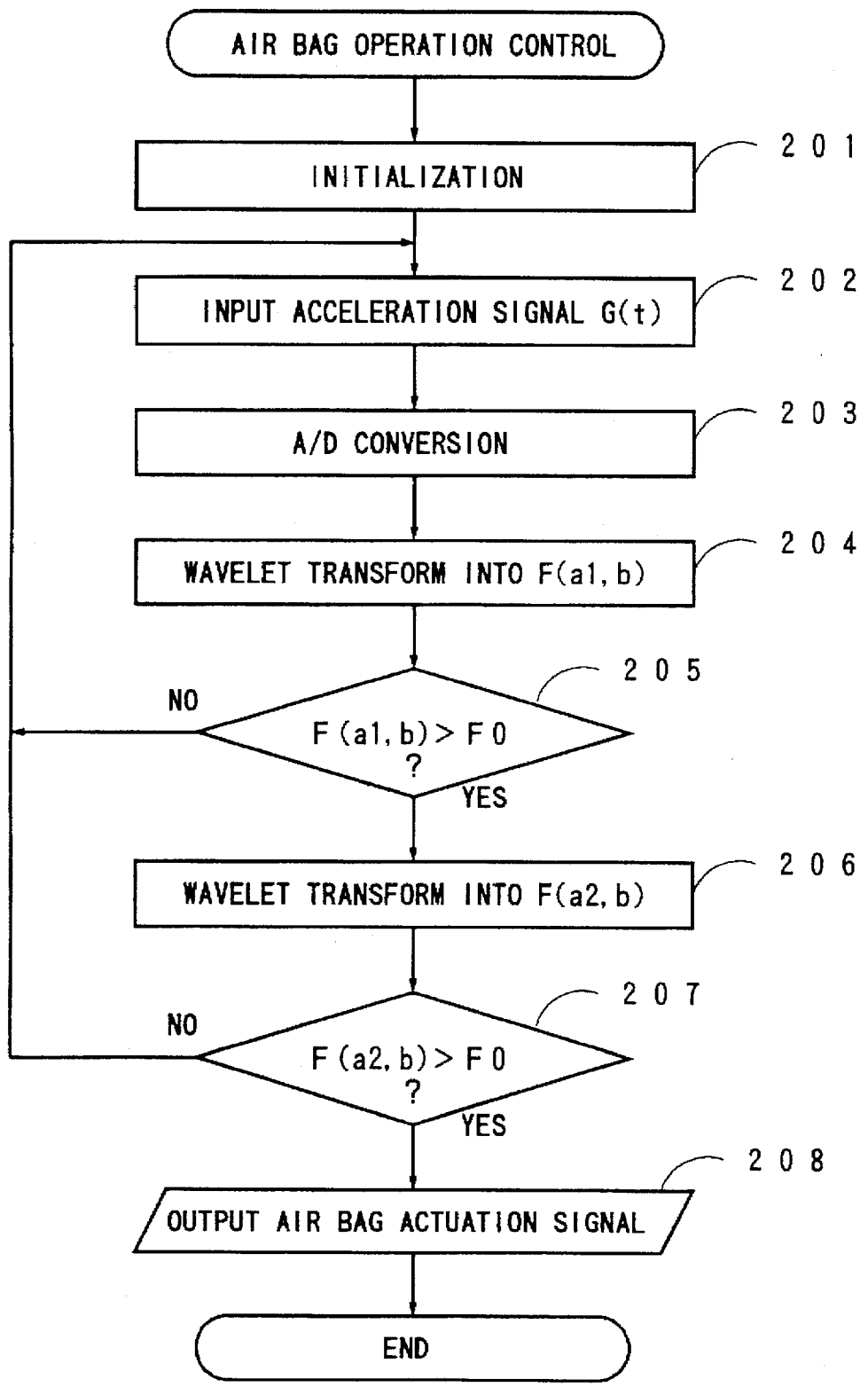
FIG. 5 is a flowchart showing operation of an air bag system according to another embodiment of the present invention.

FIG. 5 is a flowchart showing the operation of the air bag system according to another embodiment of the present invention, in which Steps 201–205 are substantially the same as Steps 101–105 in FIG. 4. In this embodiment, if it is determined at Step 205 that the wavelet coefficient F(a1, b) exceeds the threshold level "F0", the program proceeds to Step 206. At Step 206, the wavelet transform is performed in accordance with the time localization (b) for another scale (a2) to provide another wavelet coefficient F(a2, b). Then, at Step 207, the wavelet coefficient F(a2, b) is compared with the threshold level "F0". If it is determined that the former exceeds the latter, the program proceeds to Step 208 where the signal for actuating the air bag system is output. Thus, since the actuating signal is output only when both of the wavelet coefficients F(a1, b) and F(a2, b) with respect to the scales (a1) and (a2) exceed the threshold level "F0", it may be so arranged that, in the case where the impact is applied on the vehicle 1 from its frontal direction as shown in FIG. 3, the air bag device 4 can not be operated by a relatively small an impact "Fs" on the vehicle 1, but the air bag device 4 can be operated only when a relatively large an impact "Ff" is applied continuously.

Figure 6:
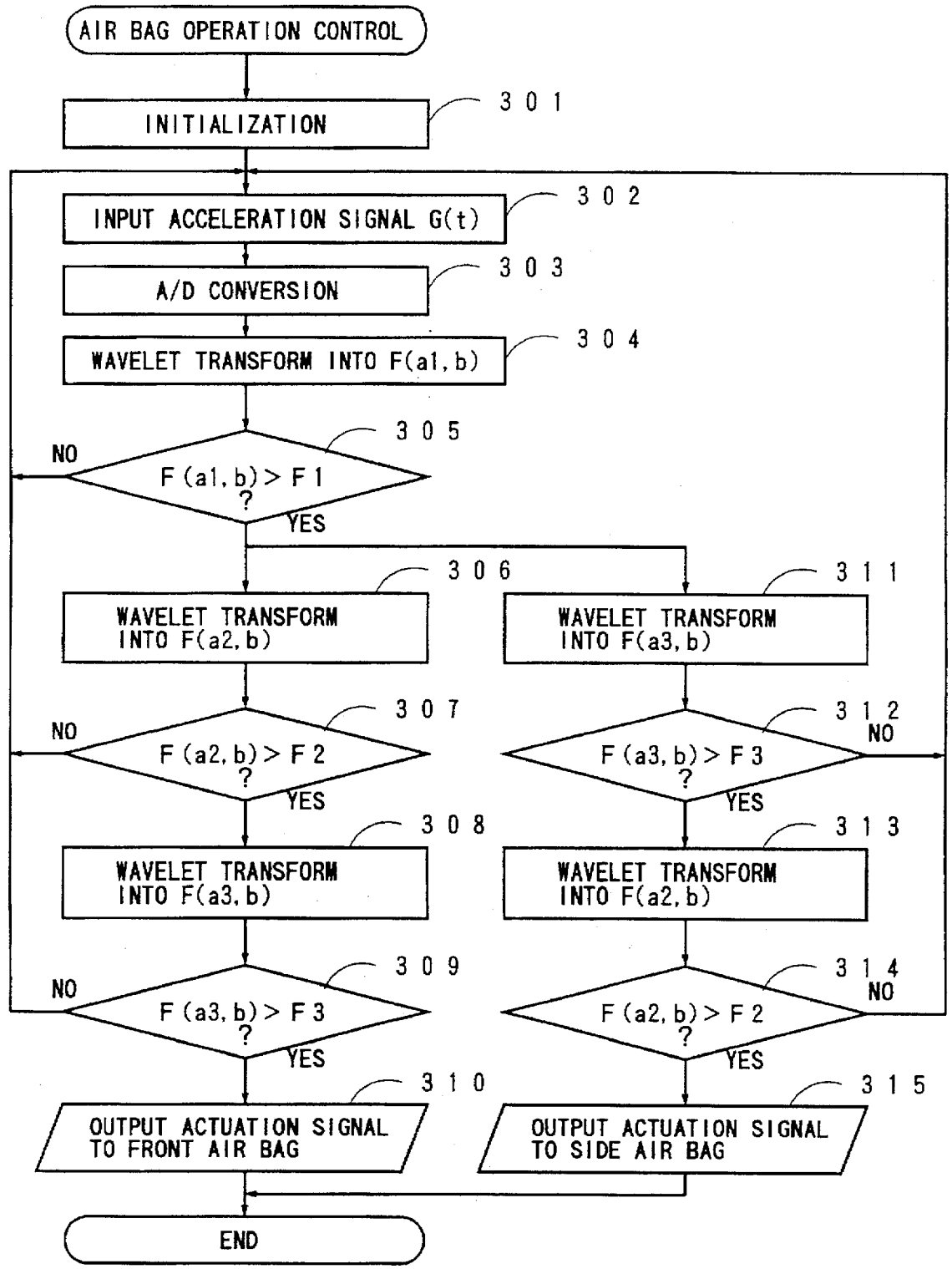
FIG. 6 is a flowchart showing operation of an air bag system according to a further embodiment of the present invention.

FIG. 6 is a flowchart showing the operation of the air bag system according to a further embodiment of the present invention, in which Steps 301–303 are substantially the same as Steps 101–103 in FIG. 4, and the operation corresponding to the one performed at Step 104 is performed at Steps 304, 308 and 313, wherein not only the air bag Bf mounted in the steering wheel pad in front of the vehicle driver can be actuated, but also the air bags Br, Bl mounted on both of the right and left sides can be actuated. In the flowchart of FIG. 6, one of the air bags Br, Bl is shown, but the other one is omitted, because both of them are arranged to operate in the same manner. At Step 304, the wavelet transform is performed in accordance with the time localization (b) for the scale (a1) to provide the wavelet coefficient F (a1, b), which is compared with a predetermined threshold level "F1". If it is determined that the wavelet coefficient F(a1, b) exceeds the threshold level "F1", the program proceeds to Steps 306, 311 where a signal for actuating the air bag system is output.

At Step 306, further wavelet transform is performed in accordance with the time localization (b) for another scale (a2) to provide another wavelet coefficient F(a2, b). Then, at Step 307, the wavelet coefficient F(a2, b) is compared with the threshold level "F2". If it is determined that the former exceeds the latter, the program proceeds to Step 308, where the wavelet transform is performed in accordance with the time localization (b) for the scale (a3) to provide a wavelet coefficient F(a3, b), which is compared with another threshold level "F3" at Step 309. And, only when the wavelet coefficient F(a3, b) exceeds the threshold level "F3", the program proceeds to Step 310, where the signal for actuating the front air bag Bf is output. Thus, if it is determined that the wavelet coefficients F(a1, b), F(a2, b) and F(a3, b) are less than the threshold levels "F1", "F2" and "F3", respectively, the program returns to Step 302.

At Step 311, further wavelet transform is performed in accordance with the time localization (b) for another scale (a3) to provide another wavelet coefficient F(a3, b). Then, at Step 312, the wavelet coefficient F(a3, b) is compared with the threshold level "F3". If it is determined that the former exceeds the latter, the program proceeds to Step 313, where the wavelet transform is performed in accordance with the time localization (b) for the scale (a2) to provide the wavelet coefficient F(a2, b), which is compared with the threshold level "F2". And, only when the wavelet coefficient F(a2, b) exceeds the threshold level "F2", the program proceeds to Step 315, where the signal for actuating the side air bag Bl (or Br) is output. If it is determined at Steps 312, 314 that the wavelet coefficients F(a3, b) and F(a2, b) are less than the threshold levels "F3" and "F2", respectively, the program returns to Step 302. According to this embodiment, therefore, more than one of a plurality of air bags can be selected to be operated in response to direction of the impact on the vehicle. Furthermore, more than one of a plurality of air bags can be selected to be operated in response to degree of the impact on the vehicle 1. Combining these features, they can be selected in response to the direction and degree of the impact on the vehicle 1.

Figure 12:
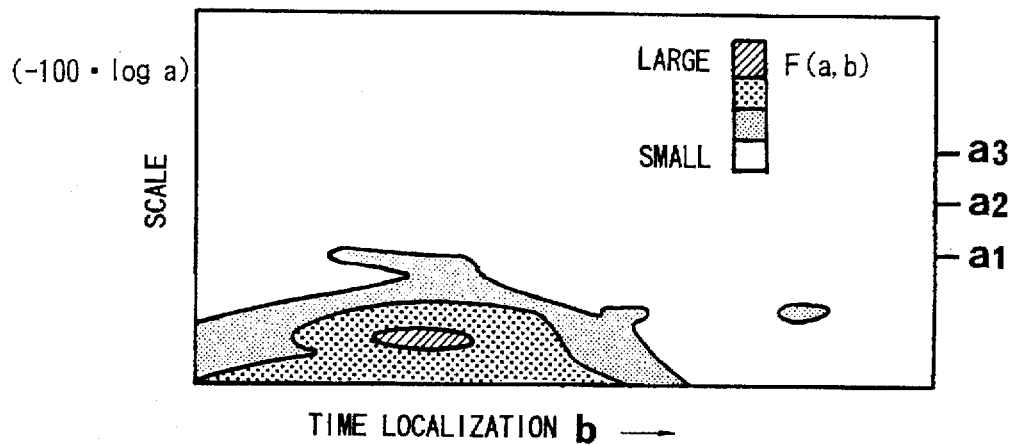
FIG. 12 is a diagram showing an example of a pattern of a wavelet coefficient provided for detecting an impact in another embodiment of the present invention.
Figure 13:
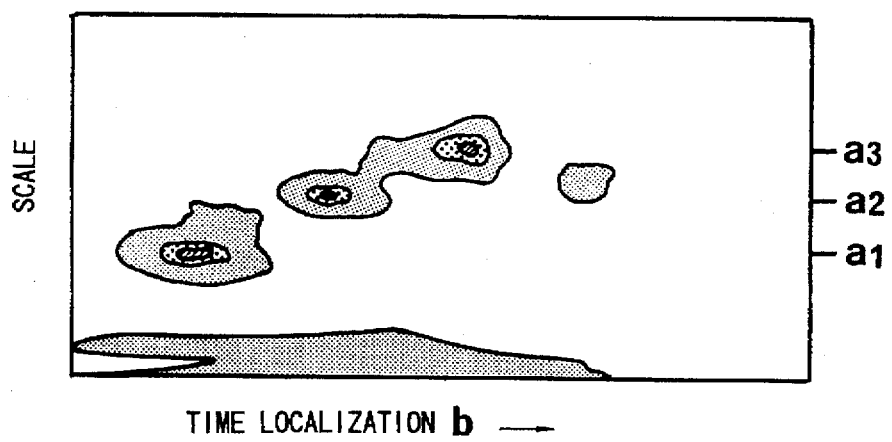
FIG. 13 is a diagram showing another example of a pattern of a wavelet coefficient provided for detecting an impact in another embodiment of the present invention.
Figure 14:
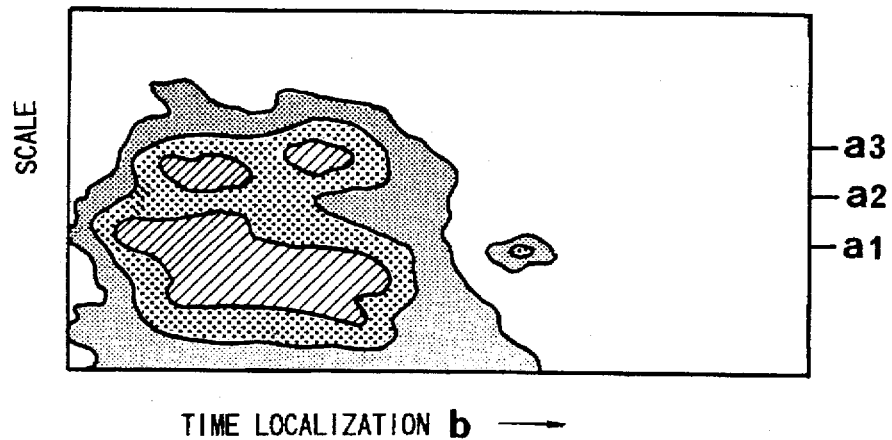
FIG. 14 is a diagram showing a further example of a pattern of a wavelet coefficient provided for detecting an impact in another embodiment of the present invention.
Figure 15:
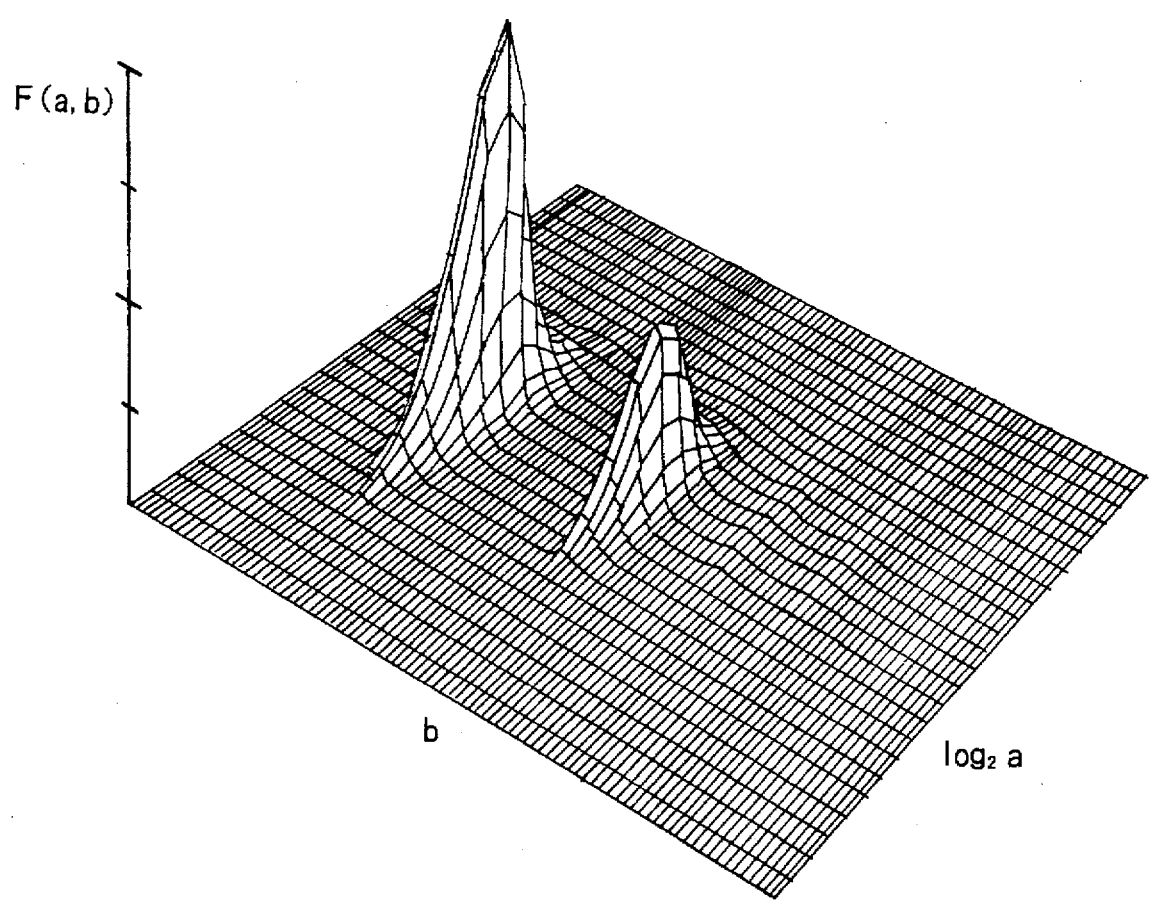
FIG. 15 is a diagram of an example of a wavelet coefficient shown by three-dimension according to the present invention.

FIGS. 12–14 illustrate various conditions of the wavelet coefficient F(a, b) according to the wavelet analysis, in the case where different impacts are applied on the vehicle 1 as shown in FIGS. 9–11. In FIG. 12, the magnitude of the wavelet coefficient F(a, b) is indicated by slash and density of dots. In each figure, the scale parameter (a) is indicated by logarithmic value. The conditions of the wavelet coefficient F(a, b) may be illustrated by three-dimension as shown in FIG. 15 which does not directly correspond to any of FIGS. 12–14. The scales (a1), (a2) and (a3) as shown in FIGS. 12–14 are examples set as reference data provided for the wavelet transform which is executed in accordance with the flowchart in FIG. 6, and various values may be set in response to the information about the aforementioned vibration propagating systems vb1, vb2 and vb3. Futhermore, in response to the information about the vibration propagating systems, a plurality of transformed values may be provided for the function f(t) on the basis of a plurality of wavelet functions, such as Gabor function, Mexican hat function, French hat function, Haar function, or the like. Based on those transformed values, one of the vibration propagating systems vb1, vb2 and vb3 may be selected so as to select one or more of the air bags Bf, Br and Bl to be inflated.

Figure 7:
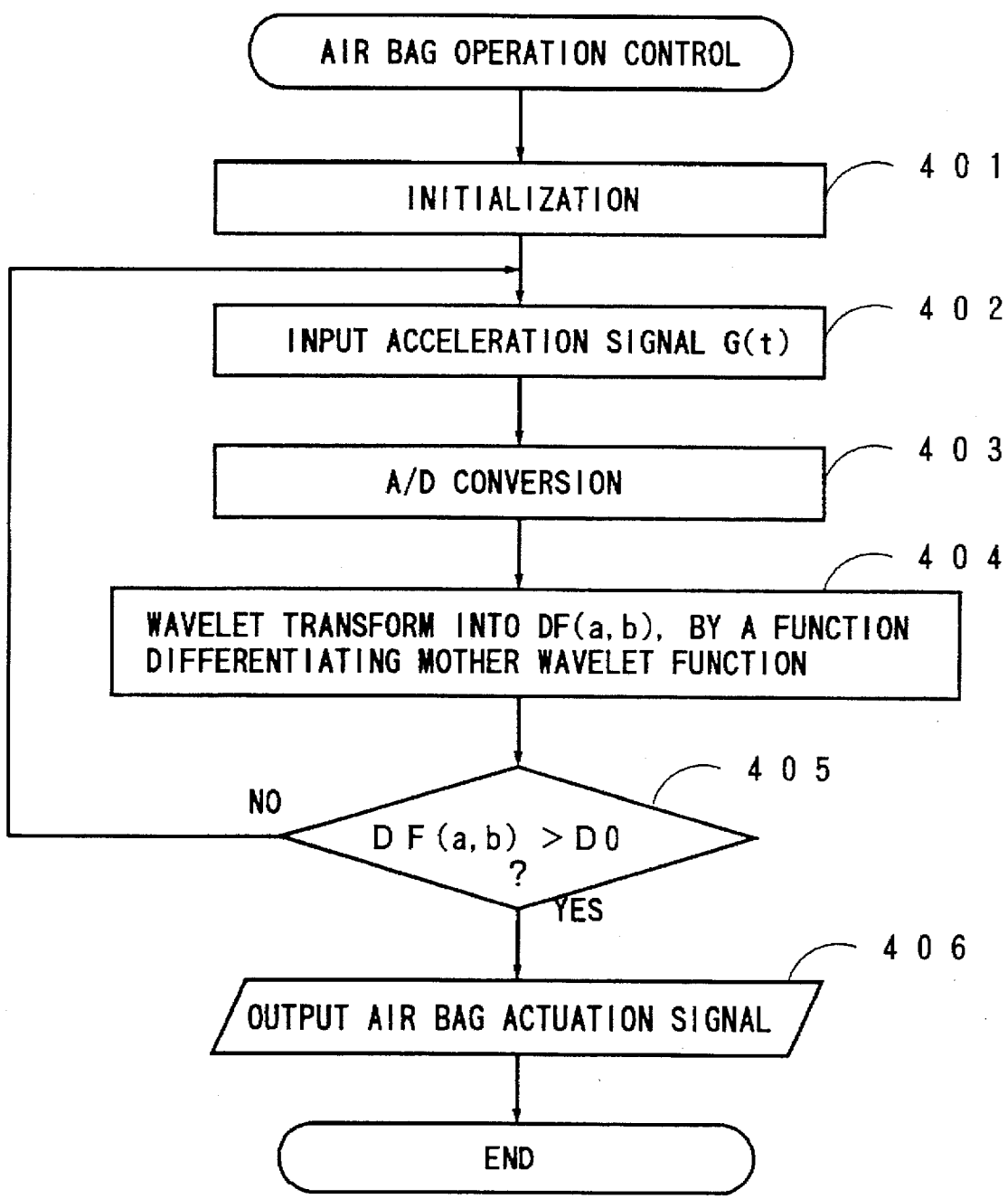
FIG. 7 is a flowchart showing operation of an air bag system according to a still further embodiment of the present invention.

FIG. 7 relates to the operation of the air bag system according to a further embodiment of the present invention, in which Steps 401–403 are substantially the same as Steps 101–103 in FIG. 4. At Step 404, the wavelet transform is performed by a wavelet function having a basis of a function which differentiated the mother wavelet function, in accordance with a shift parameter (b) for a predetermined scale parameter (a), to compute a wavelet coefficient DF (a, b). Then, the wavelet coefficient DF (a, b) is compared with a predetermined reference value "D0" at Step 405. If it is determined that the former is larger than the latter, the program proceeds to Step 406 where the signal for actuating the air bag system is output. Otherwise, the program returns to Step 402, so that the aforementioned operation is repeated. According to the present embodiment, therefore, the wavelet transform is performed by the function including a differential factor. As a result, when the condition of the wavelet coefficient F(a, b) which is computed for each of the aforementioned embodiments, is determined, a rapid and appropriate determination can be made, without computing an inclination by differentiating the function already transformed by the wavelet function. Therefore, the influence of noise can be minimized.

Figure 8:
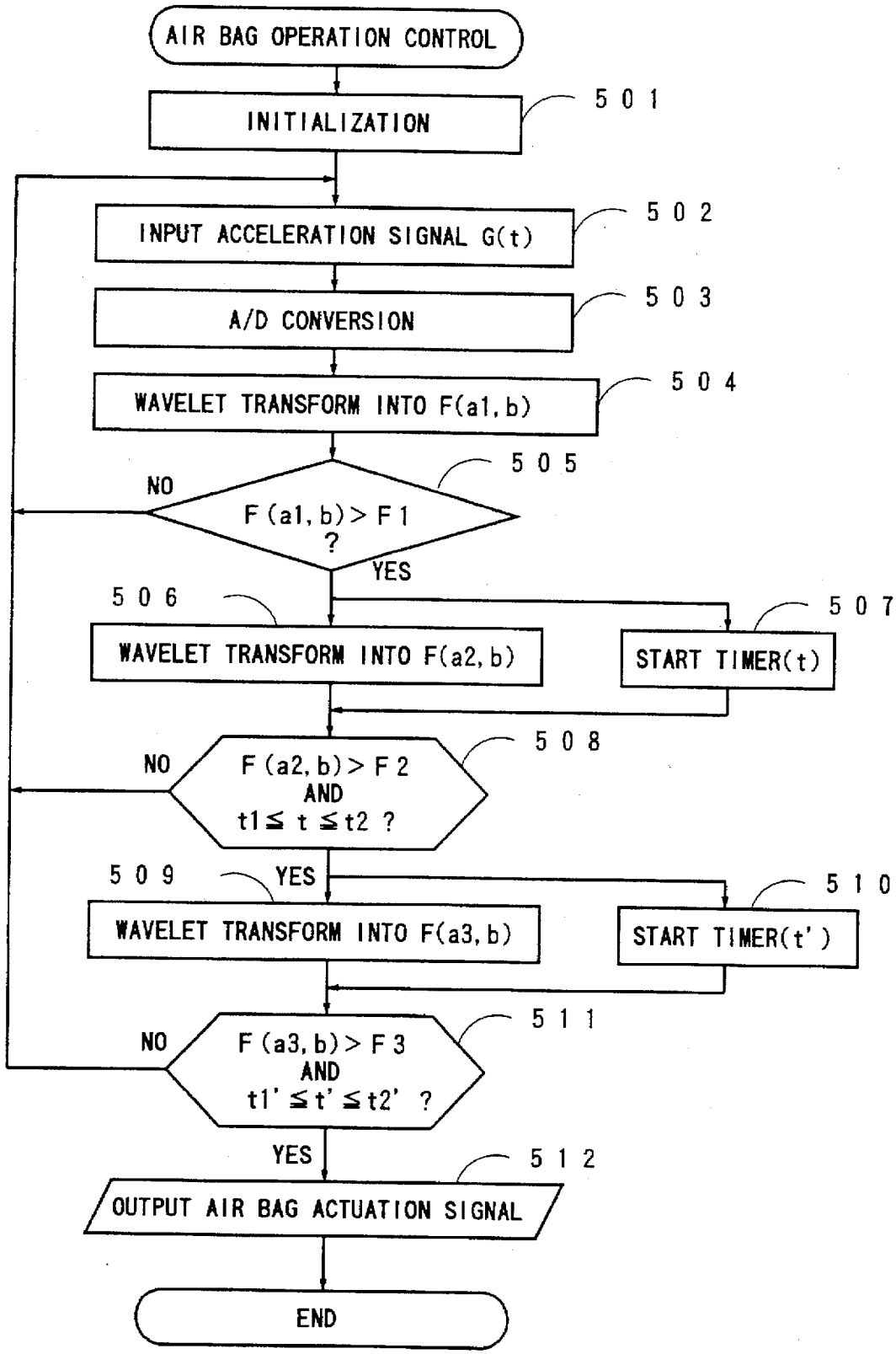
FIG. 8 is a flowchart showing operation of an air bag system according to a still further embodiment of the present invention.

FIG. 8 is a flowchart showing the operation of the air bag system according to yet further embodiment of the present invention, in which Steps 501–505 are the substantially same as Steps 101–105 in FIG. 4. According to this embodiment, if it is determined at Step 505 that the wavelet coefficient F(a1, b) exceeds the threshold level "F1", the program proceeds to Steps 506, 507 where a timer in the microcomputer 20 starts. At Step 506, the wavelet transform is performed in accordance with the time localization (b) for the scale (a2) to provide the wavelet coefficient F(a2, b). Then, the wavelet coefficient F(a2, b) is compared with the threshold level "F2" at Step 508. If it is determined that the former exceeds the latter, and that the time (t) measured by the timer is equal to or greater than a predetermined time (t1), and it is equal to or smaller than another predetermined time (t2), then the program proceeds to Steps 509, 510 where the timer will start again. At Step 509, the wavelet transform is performed in accordance with the time localization (b) for the scale (a3) to provide a wavelet coefficient F(a3, b), which is compared with the threshold level "F3" at Step 511. If it is determined that the wavelet coefficient F(a3, b) exceeds the threshold level "F3" and that the time (t') measured by the timer is equal to or greater than a predetermined time (t1'), and it is equal to or smaller than another predetermined time (t2'), then the program proceeds to Step 512 where the signal for actuating the air bag system is output.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A method for detecting an impact on a vehicle, comprising the steps of:

sensing an acceleration of said vehicle;

transforming the acceleration into an electric signal indicative of the acceleration to output an acceleration signal;

transforming the acceleration signal by a wavelet function into a wavelet coefficient, said wavelet function being provided on the basis of a mother wavelet function localized in time, scaled in response to a scale parameter, and shifted in response to a shift parameter indicative of a time localization; and determining a condition of the impact on the basis of the wavelet coefficient with respect to at least a predetermined reference scale parameter.

2. The method as defined in claim 1, wherein the step of transforming the acceleration signal into the wavelet coefficient includes the step of transforming the acceleration signal by a wavelet function provided on the basis of a base function differentiating the mother wavelet function.

3. The method as defined in claim 1, further comprising the step of converting the acceleration signal into a digital signal, wherein said step of transforming the acceleration signal includes the step of transforming the digital signal into the wavelet coefficient.

4. The method as defined in claim 1, wherein said step of determining the condition of the impact includes the step of determining the condition of the impact on the basis of the condition of the wavelet coefficient with respect to a plurality of predetermined reference scale parameters.

5. The method as defined in claim 1, wherein said step of determining the condition of the impact includes the step of determining the condition of the impact on the basis of the timing of generating the wavelet coefficient with respect to a plurality of predetermined reference scale parameters.

6. An apparatus for detecting an impact on a vehicle, comprising:

means for sensing an acceleration of said vehicle;

means for transforming the acceleration into an electric signal indicative of the acceleration to output an acceleration signal;

means for transforming the acceleration signal by a wavelet function into a wavelet coefficient, said wavelet function being provided on the basis of a mother wavelet function localized in time, scaled in response to a scale parameter, and shifted in response to a shift parameter indicative of a time localization; and means for determining a condition of the impact on the basis of the wavelet coefficient with respect to at least a predetermined reference scale parameter.

7. The apparatus as defined in claim 6, wherein said means for transforming the acceleration signal into the wavelet coefficient includes means for transforming the acceleration signal by a wavelet function provided on the basis of a base function differentiating the mother wavelet function.

8. The apparatus as defined in claim 6, further comprising means for converting the acceleration signal into a digital signal, wherein said means for transforming the acceleration signal includes means for transforming the digital signal into the wavelet coefficient.

9. The apparatus as defined in claim 6, wherein said means for determining the condition of the impact includes means for determining the condition of the impact on the basis of the condition of the wavelet coefficient with respect to a plurality of predetermined reference scale parameters.

10. The apparatus as defined in claim 6, wherein said means for determining the condition of the impact includes means for determining the condition of the impact on the basis of the timing of generating the wavelet coefficient with respect to a plurality of predetermined reference scale parameters.

11. The apparatus as defined in claim 6, further comprising means for integrating the acceleration signal by convolution of the wavelet function with respect to at least a certain scale parameter to provide a wavelet filter for the acceleration signal.

12. The apparatus as defined in claim 6, further comprising means for restraining passengers in said vehicle in accordance with the result of determination by said means for determining the condition of the impact.

13. The apparatus as defined in claim 12, further comprising means for converting the acceleration signal into a digital signal, wherein said means for transforming the acceleration signal includes means for transforming the digital signal into the wavelet coefficient.

14. The apparatus as defined in claim 12, wherein said means for determining the condition of the impact includes means for determining the condition of the impact on the basis of the condition of the wavelet coefficient with respect to a plurality of predetermined reference scale parameters.

15. The apparatus as defined in claim 12, wherein said means for determining the condition of the impact includes means for determining the condition of the impact on the basis of the timing of generating the wavelet coefficient with respect to a plurality of predetermined reference scale parameters.

16. The apparatus as defined in claim 12, wherein said restraining means includes a plurality of vehicle restraint devices, wherein said means for transforming the acceleration signal into the wavelet coefficient includes means for providing a plurality of predetermined reference scale parameters on the basis of vibration systems propagating from a plurality of outer sections of said vehicle to said sensing means, to provide a wavelet coefficient on the basis of said reference scale parameters, respectively, and wherein said means for determining the condition of the impact includes means for determining the impact on each of the outer sections of said vehicle on the basis of the respective wavelet coefficient with respect to each reference scale parameter provided for each of the outer sections, and actuating at least one of said restraint devices in accordance with the result of said means for determining the condition of the impact.

17. The apparatus as defined in claim 12, wherein said restraining means includes a plurality of vehicle restraint devices, wherein said means for transforming the acceleration signal into the wavelet coefficient includes means for providing a plurality of mother wavelet functions on the basis of vibration systems propagating from a plurality of outer sections of said vehicle to said sensing means, to provide a plurality of wavelet coefficients for said vibration systems on the basis of said mother wavelet functions, respectively, and wherein said means for determining the condition of the impact includes means for determining the impact on each of the outer sections of said vehicle on the basis of the respective wavelet coefficient provided for each of the outer sections, and actuating at least one of said restraint devices in accordance with the result of said means for determining the condition of the impact.

18. The apparatus as defined in claim 12, wherein said means for transforming the acceleration signal into the wavelet coefficient includes means for transforming the acceleration signal by a wavelet function provided on the basis of a base function differentiating the mother wavelet function.

19. The apparatus as defined in claim 12, further comprising means for integrating the acceleration signal by convolution of the wavelet function with respect to at least a certain scale parameter to provide a wavelet filter for the acceleration signal.

\* \* \* \* \*